(12) United States Patent
Cosse

(10) Patent No.: US 10,653,504 B2
(45) Date of Patent: May 19, 2020

(54) ELECTROMECHANICAL SYSTEMS, METHODS, ORTHODONTIC BRACKETS, AND TOOLS FOR ADJUSTING ORTHODONTIC PRESCRIPTIONS OF ORTHODONTIC BRACKETS WITH ADJUSTABLE ARCHWIRE PASSAGES

(71) Applicant: Christopher C. Cosse, Shreveport, LA (US)

(72) Inventor: Christopher C. Cosse, Shreveport, LA (US)

( * ) Notice: Subject to any disclaimer, the term of this patent is extended or adjusted under 35 U.S.C. 154(b) by 938 days.

(21) Appl. No.: 14/694,453

(22) Filed: Apr. 23, 2015

(65) Prior Publication Data

US 2015/0305833 A1   Oct. 29, 2015

Related U.S. Application Data

(60) Provisional application No. 61/984,622, filed on Apr. 25, 2014.

(51) Int. Cl.
*A61C 7/14* (2006.01)
*A61C 7/02* (2006.01)
(Continued)

(52) U.S. Cl.
CPC .............. *A61C 7/146* (2013.01); *A61C 7/002* (2013.01); *A61C 7/02* (2013.01); *A61C 7/14* (2013.01); *A61C 7/20* (2013.01)

(58) Field of Classification Search
CPC .. A61C 8/22; A61C 7/002; A61C 7/14; A61C 7/146
(Continued)

(56) References Cited

U.S. PATENT DOCUMENTS

| 1,280,628 A | 10/1918 | Angle |
| 1,299,103 A * | 4/1919 | Angle ..................... A61C 7/04 |
| | | 433/4 |

(Continued)

FOREIGN PATENT DOCUMENTS

| WO | WO 96/39934 | 12/1996 |
| WO | WO 01/87179 A1 | 11/2001 |

(Continued)

OTHER PUBLICATIONS

English-language abstract of PCT Patent Application Publication No. WO 2003/096922, Nov. 17, 2003.
(Continued)

*Primary Examiner* — Edward Moran
*Assistant Examiner* — Matthew P Saunders
(74) *Attorney, Agent, or Firm* — DAscenzo Intellectual Property Law, P.C.

(57) ABSTRACT

Electromechanical systems, methods, orthodontic brackets, and tools for adjusting orthodontic prescriptions of orthodontic brackets with adjustable archwire passages are disclosed herein. The methods include operatively engaging an orthodontic bracket with an engagement structure of an electronic orthodontic adjustment tool, electronically determining a present orientation of an archwire slot of the orthodontic bracket, displaying a displayed orientation of the archwire slot, and adjusting the orientation of the archwire slot based on the displayed orientation. The orthodontic brackets include a base, a body, a retention structure, an orientation-determining structure, and a transmitter. The tools include an engagement structure, an orientation-determining structure, and an orientation indicator.

16 Claims, 4 Drawing Sheets

(51) Int. Cl.
*A61C 7/00* (2006.01)
*A61C 7/20* (2006.01)

(58) Field of Classification Search
USPC ................... 382/106; 433/2, 3, 16, 17, 24
See application file for complete search history.

(56) References Cited

U.S. PATENT DOCUMENTS

| | | | |
|---|---|---|---|
| 1,821,171 A | 9/1931 | Atkinson | |
| 3,435,527 A | 4/1969 | Kesling | |
| 3,772,787 A | 11/1973 | Hanson | |
| 4,043,364 A * | 8/1977 | Rose | B21F 1/002 140/106 |
| 4,077,126 A | 3/1978 | Pletcher | |
| 4,144,642 A | 3/1979 | Wallshein | |
| 4,171,568 A | 10/1979 | Förster | |
| 4,197,642 A | 4/1980 | Wallshein | |
| 4,248,588 A | 2/1981 | Hanson | |
| 4,371,337 A | 2/1983 | Pletcher | |
| 4,382,780 A | 5/1983 | Kurz | |
| 4,419,078 A | 12/1983 | Pletcher | |
| 4,492,573 A | 1/1985 | Hanson | |
| 4,531,911 A | 7/1985 | Creekmore | |
| 4,559,012 A | 12/1985 | Pletcher | |
| 4,561,844 A | 12/1985 | Bates | |
| 4,597,739 A | 7/1986 | Rosenberg | |
| 4,614,497 A | 9/1986 | Kurz | |
| 4,655,708 A | 4/1987 | Fujita | |
| 4,698,017 A | 10/1987 | Hanson | |
| 4,712,999 A | 12/1987 | Rosenberg | |
| 4,850,864 A | 7/1989 | Diamond | |
| 4,878,840 A | 11/1989 | Reynolds | |
| 5,094,614 A | 3/1992 | Wildman | |
| 5,322,435 A | 6/1994 | Pletcher | |
| 5,562,444 A | 10/1996 | Heiser et al. | |
| 5,711,666 A | 1/1998 | Hanson | |
| 5,730,151 A | 3/1998 | Summer et al. | |
| 5,760,692 A | 6/1998 | Block | |
| 5,857,850 A | 1/1999 | Voudouris | |
| 6,193,508 B1 | 2/2001 | Georgakis | |
| 6,239,705 B1 | 5/2001 | Glen | |
| 6,302,688 B1 | 10/2001 | Jordan et al. | |
| 6,358,045 B1 | 3/2002 | Farzin-Nia et al. | |
| 6,582,226 B2 | 6/2003 | Jordan et al. | |
| 6,613,001 B1 | 9/2003 | Dworkin | |
| 6,632,088 B2 | 10/2003 | Voudouris | |
| 6,655,957 B2 | 12/2003 | Abels et al. | |
| 6,659,766 B2 | 12/2003 | Abels et al. | |
| 6,786,719 B2 | 9/2004 | McGann | |
| 7,314,372 B2 | 1/2008 | Belfor et al. | |
| 7,357,635 B2 | 4/2008 | Belfor et al. | |
| 7,641,472 B2 | 1/2010 | Sears et al. | |
| 7,771,640 B2 | 8/2010 | Cosse | |
| 7,819,660 B2 | 10/2010 | Cosse | |
| 7,887,324 B2 | 2/2011 | Singh | |
| 8,123,520 B2 | 2/2012 | Yamamoto et al. | |
| 8,192,196 B2 | 6/2012 | Singh | |
| 8,333,203 B2 | 12/2012 | Spiridigliozzi et al. | |
| 8,771,149 B2 | 7/2014 | Rahman et al. | |
| 8,851,887 B1 | 10/2014 | Ostreicher | |
| 2007/0264605 A1 | 11/2007 | Belfor et al. | |
| 2009/0061380 A1 | 3/2009 | Yamamoto et al. | |
| 2009/0074251 A1* | 3/2009 | Sears | G06T 7/246 382/106 |
| 2009/0286195 A1 | 11/2009 | Sears et al. | |
| 2010/0092904 A1 | 4/2010 | Esposti et al. | |
| 2011/0183280 A1* | 7/2011 | Cosse | A61C 7/14 433/13 |
| 2012/0172678 A1 | 7/2012 | Logan et al. | |
| 2012/0308952 A1* | 12/2012 | Cosse | A61C 7/12 433/3 |
| 2014/0205962 A1* | 7/2014 | Damon | A61C 7/22 433/13 |
| 2014/0248574 A1 | 9/2014 | Yoon et al. | |
| 2014/0272751 A1* | 9/2014 | Cosse | A61C 7/02 433/9 |

FOREIGN PATENT DOCUMENTS

| | | | |
|---|---|---|---|
| WO | WO 2003/096922 A1 | | 11/2003 |
| WO | WO2011/141937 | * | 11/2011 |
| WO | WO 2013/080181 A1 | | 6/2013 |
| WO | WO 2013/121316 A1 | | 8/2013 |

OTHER PUBLICATIONS

Abstract, Yoshida, et al., "A new method for qualitative and quantitative evaluation of tooth displacement under the application of orthodontic forces using magnetic sensors," Med. Eng. Phys., May 2000;22(4):293-300, 2 pages.

English-language abstract of PCT Patent Application Publication No. WO 01/87179 A1, Nov. 22, 2001.

English-language machine translation of PCT Patent Application Publication No. WO 01/87179 A1, Nov. 22, 2001.

* cited by examiner

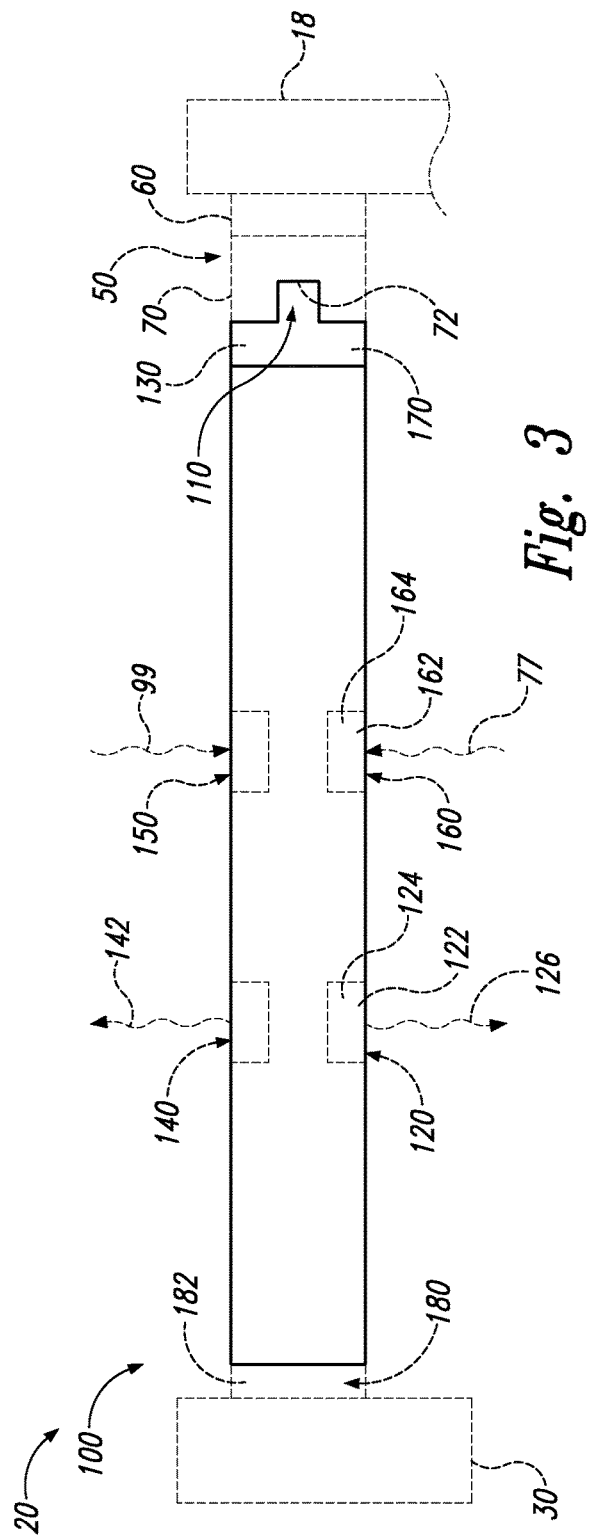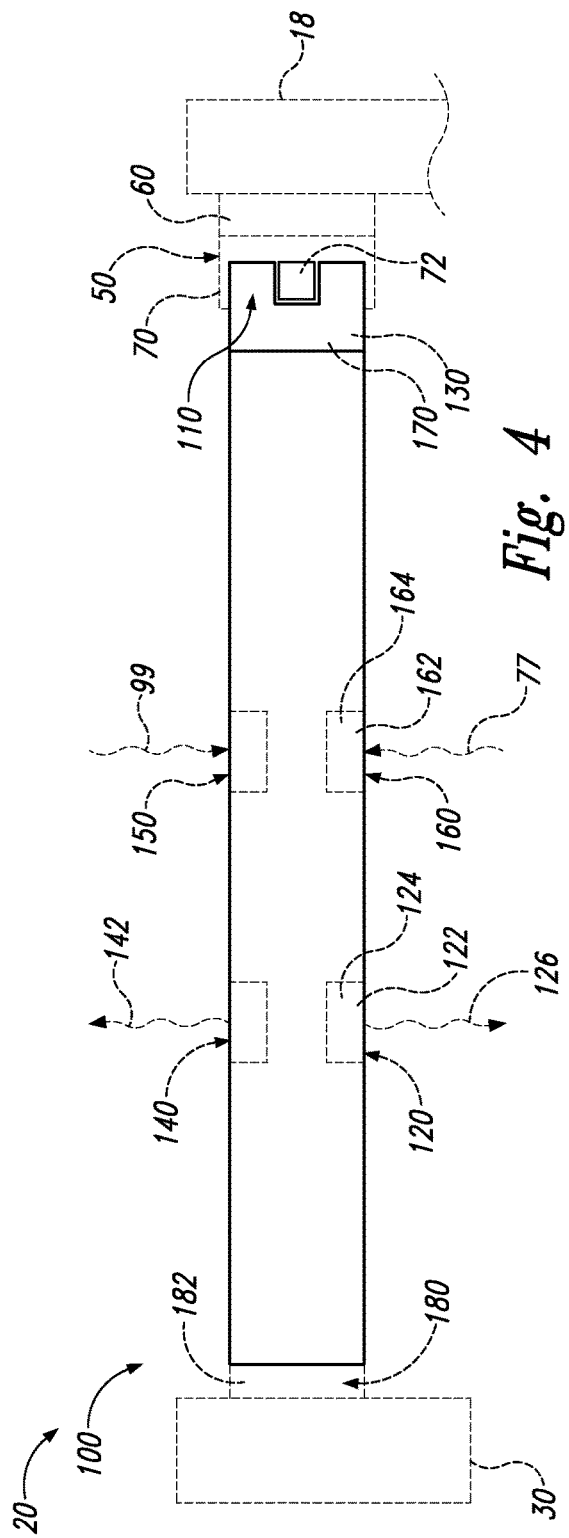

ELECTROMECHANICAL SYSTEMS, METHODS, ORTHODONTIC BRACKETS, AND TOOLS FOR ADJUSTING ORTHODONTIC PRESCRIPTIONS OF ORTHODONTIC BRACKETS WITH ADJUSTABLE ARCHWIRE PASSAGES

RELATED APPLICATION

This application claims priority to U.S. Provisional Patent Application No. 61/984,622, which was filed on Apr. 25, 2014, the complete disclosure of which is hereby incorporated by reference.

FIELD OF THE DISCLOSURE

The present disclosure is directed to electromechanical systems, methods, and tools for adjusting orthodontic prescriptions of orthodontic brackets with adjustable archwire passages.

BACKGROUND OF THE DISCLOSURE

Orthodontic brackets typically are small, slotted devices for use during orthodontic treatment. The brackets usually are configured for attachment to the front surfaces of teeth, either by directly cementing a bracket to a tooth surface or by bonding the bracket to a metal band that encircles the tooth, though in some instances brackets may be attached to the back surfaces of teeth. Slots in the brackets, which may be referred to herein as archwire slots and/or as archwire passages, are disposed horizontally, or generally horizontally, and are configured to receive an archwire. Traditionally, an archwire is a resilient, curved piece of wire that may be bent and/or twisted prior to installation in the bracket slots, with the archwire typically extending through the slots of all of the orthodontic brackets that are attached to a patient's upper or lower teeth. Engagement between the archwire and the brackets creates corrective, or prescriptive, forces that are directed to the teeth by the orthodontic brackets to urge the teeth into a correct, or desired, alignment, or occlusion.

Orthodontic treatment of a patient's teeth typically requires periodic adjustment of the forces that are imparted to the patient's teeth by the installed orthodontic brackets, archwire(s), etc. Adjustments include changing the magnitude and/or direction of the forces that are imparted to the patient's teeth, such as to adjust the degree to which torque, tip, and/or rotational forces are imparted to the patient's teeth to change the angulation, inclination, rotation, height, and/or location of the teeth in order to move the teeth toward an optimal, or desired, occlusion.

As used herein, tipping forces refer to forces applied to the tooth in the mesial-distal direction. Thus, tipping forces may impact angulation. Torsional forces refer to forces applied to the tooth by an archwire that is in torsion within the archwire passage. Thus, torsional forces tend to rotate the tooth in the buccal-lingual or labial-lingual direction and may impact inclination. Rotational forces refer to applied forces that tend to rotate the tooth about its long axis.

Adjustment of these forces often is a trial-and-error process that requires removal of the archwire from the archwire slot, bending of the archwire, and re-insertion of the archwire into the archwire slot. Alternatively, the archwire slot may be repositioned. This may include repositioning by removing one or more orthodontic brackets from the patient's teeth and re-locating (the same or a different) orthodontic bracket on the patient's teeth.

Some orthodontic brackets permit repositioning of the archwire slot without removal of the orthodontic bracket from the patient's tooth. However, this process still may be time-consuming and/or may require some amount of trial-and-error fitting. Additionally, adjustable brackets may pose challenges for accurately determining a current archwire slot position, such as with respect to a defined treatment plan, and/or the degree to which an adjustment in the archwire slot position accurately reaches a desired position, which also may be defined by a treatment plan.

Thus, there exists a need for electromechanical systems, methods, and tools for adjusting orthodontic prescriptions of orthodontic brackets with adjustable archwire passages.

SUMMARY OF THE DISCLOSURE

Electromechanical systems, methods, orthodontic brackets, and tools for adjusting orthodontic prescriptions of orthodontic brackets with adjustable archwire passages are disclosed herein. The methods include methods of adjusting an orthodontic bracket, which includes an adjustable archwire slot, while the orthodontic bracket is operatively attached to a patient's tooth. The methods include operatively engaging the orthodontic bracket with an engagement structure of an electronic orthodontic adjustment tool. The methods further include electronically determining a present orientation of the archwire slot relative to a reference orientation at a given point in time. The methods also include displaying a displayed orientation of the archwire slot with the electronic orthodontic adjustment tool. The displayed orientation is based, at least in part, on the present orientation of the archwire slot. The methods further include adjusting the orientation of the archwire slot based, at least in part, on the displayed orientation.

The orthodontic brackets include a base configured to be operatively affixed to a tooth that is present within a patient's mouth. The orthodontic brackets also include a body that is configured to be selectively repositioned relative to the base. The body at least partially defines an archwire slot that is shaped to receive an archwire. The orthodontic brackets further include a retention structure that is configured to be selectively transitioned between a locked configuration and an unlocked configuration. When the retention structure is in the locked configuration, an orientation of the archwire slot relative to a reference orientation is at least substantially fixed. When the retention structure is in the unlocked configuration, the retention structure permits the orientation of the archwire relative to the reference orientation to be varied. The orthodontic brackets also include an orientation-determining structure that is configured to determine the orientation of the archwire slot relative to the reference orientation. The orthodontic brackets further include a transmitter that is configured to generate an orientation indication signal. The orientation indication signal is indicative of the orientation of the archwire slot relative to the reference orientation.

The tools include an electronic orthodontic adjustment tool that is configured to selectively adjust an orientation of an archwire slot, which is defined by an orthodontic bracket, relative to a reference orientation while the orthodontic bracket is operatively attached to a patient's tooth. The tools include an engagement structure that is configured to operatively engage the orthodontic bracket to selectively adjust the orientation of the archwire slot relative to the reference orientation. The tools also include an orientation-determining structure that is configured to electronically determine the orientation of the archwire slot relative to the reference orientation. The tools further include an orientation indicator that is configured to indicate the orientation of the archwire slot relative to the reference orientation.

BRIEF DESCRIPTION OF THE DRAWINGS

FIG. 3 is a schematic representation of an electronic orthodontic adjustment tool according to the present disclosure.

FIG. 4 is a schematic representation of an electronic orthodontic adjustment tool according to the present disclosure.

DETAILED DESCRIPTION AND BEST MODE OF THE DISCLOSURE

Figure 1:
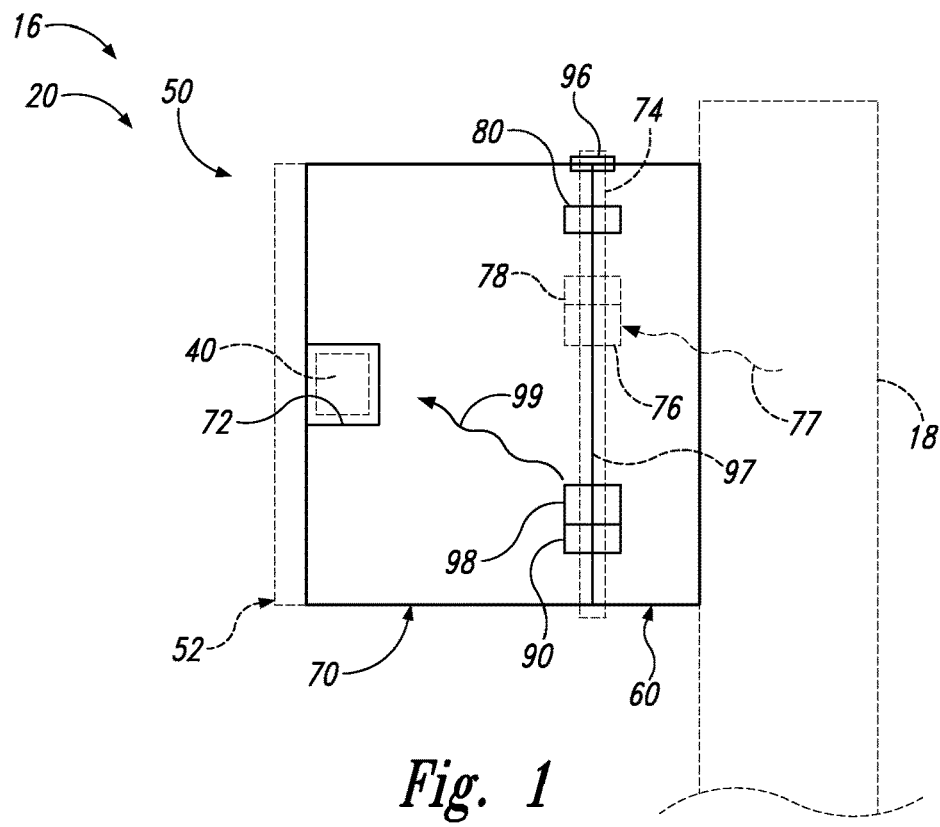
FIG. 1 is a schematic representation of examples of an orthodontic bracket having an adjustable archwire passage according to the present disclosure.

FIGS. 1-6 provide examples of orthodontic brackets 50 according to the present disclosure, of electronic orthodontic adjustment tools 100 according to the present disclosure, of orthodontic appliance systems 20 that include and/or utilize orthodontic brackets 50 and/or electronic orthodontic adjustment tools 100, and/or of methods 200, according to the present disclosure, of adjusting orthodontic brackets. Elements that serve a similar, or at least substantially similar, purpose are labeled with like numbers in each of FIGS. 1-6, and these elements may not be discussed in detail herein with reference to each of FIGS. 1-6. Similarly, all elements may not be labeled in each of FIGS. 1-6, but reference numerals associated therewith may be utilized herein for consistency. Elements, components, and/or features that are discussed herein with reference to one or more of FIGS. 1-6 may be included in and/or utilized with any of FIGS. 1-6 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

Figure 2:
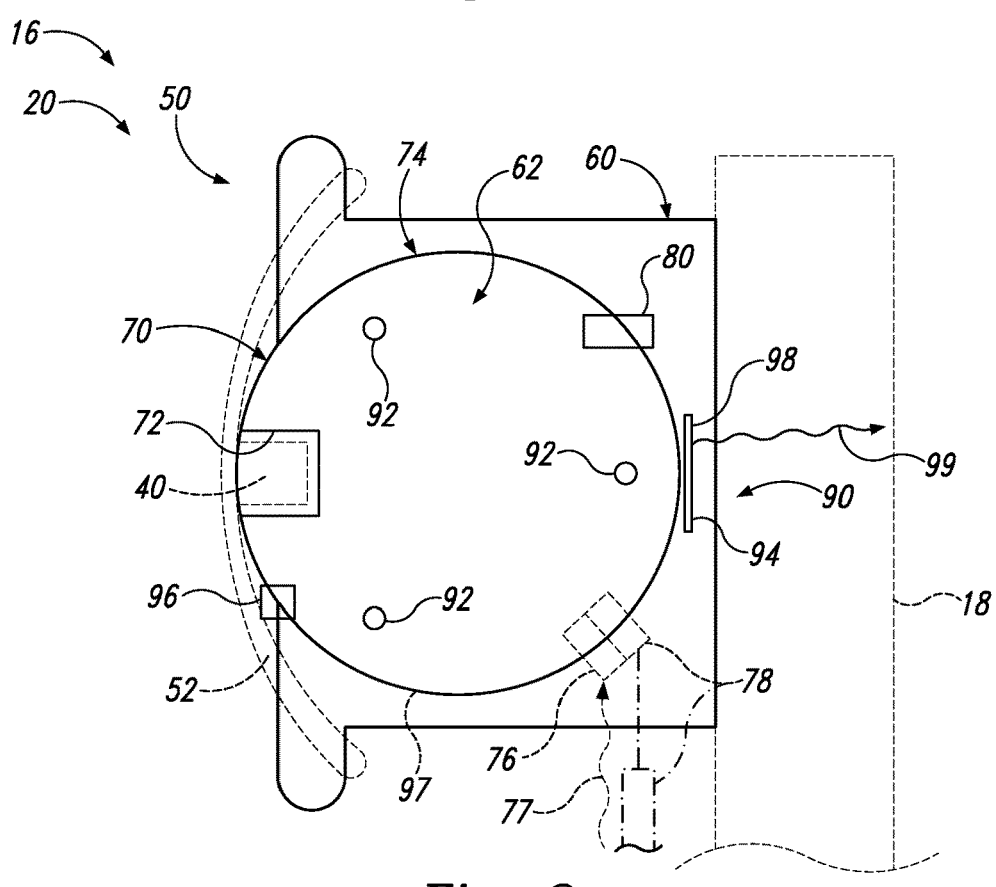
FIG. 2 is a less schematic example of an orthodontic bracket having an adjustable archwire passage according to the present disclosure.

FIG. 1 is a schematic representation of examples of an orthodontic bracket 50 having an adjustable archwire passage according to the present disclosure, while FIG. 2 is a less schematic example of an orthodontic bracket 50 having an adjustable archwire passage according to the present disclosure. Orthodontic bracket 50 also may be referred to herein as a bracket 50 and/or as an adjustable bracket 50. Bracket 50 includes a base 60, which is configured to be operatively attached to a tooth 18 that is present within a patient's mouth 16. It is within the scope of the present disclosure that bracket 50 may be operatively attached to any suitable surface of tooth 18, including a front (labial) surface of the tooth and/or a back (lingual) surface of the tooth. This operative attachment often will be directly to the surface of the tooth, although it is within the scope of the disclosure that bracket 50 may be mounted on a band or other intermediate structure that is secured to the patient's tooth.

Bracket 50 also includes a body 70 that at least partially, if not completely, defines an archwire slot 72 that is shaped to receive an archwire 40 during orthodontic treatment of a patient's teeth. Body 70 additionally or alternatively may be referred to herein as an archwire slot-defining body 70. Because body 70 contains and/or defines the archwire slot 72 of the bracket, body 70 additionally or alternatively may be referred to herein as a corrective assembly 70, as the relative orientation of the body with respect to the patient's tooth to which the bracket is mounted affects the prescriptive forces that are imparted to the tooth during orthodontic treatment. Body 70 may be at least partially, if not completely, housed within base 60, although it also is within the scope of the present disclosure that at least a portion, or even all, of the body is external base 60.

Body 70 may be configured to be adjusted, or repositioned, relative to the base without detaching the body from the base and/or while the base is operatively attached to tooth 18. This relative adjustment of the orientation and/or position of the body relative to the base, such as to translate, rotate, and/or pivot the body relative to the base, results in a corresponding adjustment of archwire slot 72 relative to the base, and thereby relative to the patient's tooth to which the base is attached. Thus, adjustment of the body relative to the base changes the prescription that is defined by the bracket, and thus the forces that are imparted to the patient's teeth during prescriptive use of the bracket. As used herein, "prescriptive use" and/or "orthodontic use" refer to use of a bracket that is secured to a patient's tooth and which contains an archwire operatively secured within the bracket's archwire slot to apply forces to the patient's tooth to alter the relative orientation of the patient's tooth in the patient's mouth. Similarly, "operatively," when used to describe a relationship between two or more components or elements, refers to the functionality for which the components or elements are designed to be used, assembled, mounted, coupled, etc.

The adjustment of body 70 relative to base 60 is enabled by an adjustment mechanism 74 that operatively couples the body to the base and permits selective adjustment of the body relative to the base. The adjustment mechanism may enable, or define, a single axis or plane of adjustment, such as by defining a pivot axis, a rotation axis, a translational plane, etc. of the body relative to the base. However, it also is within the scope of the present disclosure that the adjustment mechanism may enable, or define, more than one degree of relative movement, such as to adjust two or more of the torque, tip, and rotation imparted to the patient's tooth during prescriptive use of the bracket. As examples, adjustment mechanism 74 may be configured to permit body 70 to rotate relative to base 60 about at least one rotational axis, about at least two rotational axes, or about three distinct rotational axes. As additional examples, adjustment mechanism 74 may be configured to permit body 70 to translate relative to base 60 along at least one translational axis, along at least two translational axes, or along three distinct translational axes.

Structurally, adjustment mechanism 74 may define the permitted relative movement of the body relative to the base. The adjustment mechanism may be a separate component that interconnects the base and the body. Alternatively, the adjustment mechanism may form at least a portion of the base and/or the body, such as by having portions of the adjustment mechanism be part of the base and/or the body. Examples of structures and/or mechanisms that may be utilized by adjustment mechanism to provide the relative movement between the base and the body include one or more slides, pivots, races, hinges, ball-and-sockets, dovetail assemblies, springs, elastomers, compliant members, grooves, slides, rails, tracks, channels, sliders, ratchets, axles, wedges, etc.

As more specific examples, and as illustrated in FIG. 2, body 70 may define a cylindrical or spherical structure, while base 60 may define a cavity 62 that is sized to receive body 70. When body 70 defines the cylindrical structure, bracket 50 may be configured to selectively permit rotation of body 70 relative to base 60 about a single rotational axis (i.e., a longitudinal axis of the cylindrical structure). When body 70 defines the spherical structure, bracket 60 may be configured to selectively permit rotation of body 70 relative to base 60 about two, or even three orthogonal axes of rotation.

Also as illustrated in FIGS. 1-2, bracket 50 further may include a retention structure 80 that selectively secures the body in a selected orientation relative to the base (and thus relative to a patient's tooth to which the bracket is mounted). Retention structure 80 thus may be described as selectively restricting adjustment of the position of the body independent of and/or relative to the base of the bracket. The retention structure may take any suitable form and/or utilize any suitable structure, and the retention structure may be integrated with, cooperate with, and/or function independent of adjustment mechanism 74 without departing from the scope of the present disclosure.

Retention structure 80 is configured to be selectively transitioned between a locked configuration and an unlocked configuration. In the locked configuration, retention structure 80 restricts relative movement between the body and the base of the bracket, thereby restricting adjustment of the position of the archwire slot relative to the patient's tooth to which the bracket is attached.

In the unlocked configuration, retention structure 80 permits the body to be moved relative to, or independent of, the base of the bracket. However, when in the unlocked configuration, retention structure 80 still may resist separation of body 70 from base 60, may operatively interlock body 70 to base 60, and/or may operatively attach body 70 to base 60. The locked configuration additionally or alternatively may be referred to as a secured configuration and/or an operative configuration. The unlocked configuration additionally or alternatively may be referred to as an adjustment configuration and/or a released configuration. When the retention structure is in the locked or unlocked configuration, orthodontic bracket 50 additionally or alternatively may be referred to herein as being in the locked or unlocked configuration.

Retention structure 80 may include any suitable structure that is configured to transition between the locked configuration and the unlocked configuration, that is configured to selectively maintain the orientation of the archwire slot relative to the base (i.e., when in the locked configuration), that is configured to selectively permit the orientation of the archwire slot to be varied (i.e., when in the unlocked configuration), and/or that is configured to (at least selectively) retain body 70 operatively attached to base 60. Examples of retention structure 80 include any suitable pin, latch, clasp, wedge, fastener, cam, receptacle, etc.

Bracket 50 further may include at least one ligature 52 that is configured to retain archwire 40 within archwire slot 72. Ligature 52 may include any suitable structure that may, or that may be utilized to, retain the archwire within the archwire slot. This may include any suitable ligating structure that is configured to be operatively attached and/or affixed to base 60 and/or to body 70, such as an elastomeric band, as well as any suitable ligating structure that forms a portion of bracket 50, such as when bracket 50 is a self-ligating bracket 50.

Orthodontic bracket 50, which is schematically illustrated in FIGS. 1-2, may have any suitable shape, size, and/or components for receiving an archwire into an archwire slot of the bracket to impart prescriptive forces to a patient's teeth during orthodontic use of the bracket.

As discussed, bracket 50 is an adjustable orthodontic bracket 50. This may include any suitable orthodontic bracket that is adapted, configured, designed, and/or constructed to permit adjustment of the orientation of archwire slot 72 relative to a reference orientation thereof, relative to base 60, relative to tooth 18, relative to another tooth that may be present within patient's mouth 16, and/or relative to another orthodontic bracket that may be present within patient's mouth 16. Additionally or alternatively, this also may include any suitable orthodontic bracket that may be configured to permit adjustment of the orientation of the archwire slot without separation of the bracket from the tooth.

Bracket 50 also may, but is not required to, include additional components, regions, and/or features that are conventional to orthodontic bracket bases/bodies/housings, such as appropriately shaped and/or contoured tooth-contacting surfaces, tie wings, or other suitable mounts for ligating structures, such as ligatures, orthodontic chains, powerchains, springs, elastic bands, and the like. In this regard, examples of orthodontic brackets and bracket assemblies, as well as components and uses thereof, and accessories therefor, are disclosed in U.S. Pat. No. 8,337,198, in U.S. Patent Application Publication Nos. 2012/0308952, 2011/0183280, and 2014/0272751 in U.S. Provisional Patent Application No. 61/913,122, and in U.S. patent application Ser. Nos. 14/559,100 and 14/215,237, the complete disclosures of which are hereby incorporated by reference. These and the subsequently incorporated patent references additionally or alternatively disclose optional additional structures, features, components, and the like that may be used with brackets 50 according to the present disclosure (so long as doing so does not impair the operation and functionality expressly presented herein).

Additional examples of ligating orthodontic brackets are disclosed in U.S. Pat. Nos. 6,302,688, 6,582,226, 4,597,739, 4,878,840, 3,772,787, 4,248,588, 4,492,573, 4,614,497, 4,698,017, 1,280,628, 1,821,171, and 3,435,527, the disclosures of which are hereby incorporated by reference. Examples of self-ligating orthodontic brackets are disclosed in U.S. Pat. Nos. 6,659,766, 6,655,957, 6,358,045, 6,193,508, 5,857,850, 5,711,666, 5,562,444, 5,322,435, 5,094,614, 4,559,012, 4,531,911, 4,492,573, 4,419,078, 4,371,337, 4,077,126, 4,144,642, 4,248,588, 4,698,017, 3,772,787, 4,561,844, 4,655,708, 4,197,642, 4,712,999, and 4,171,568, the disclosures of which are hereby incorporated by reference. Still further additional examples of orthodontic brackets are disclosed in U.S. Patent Nos. 7,819,660, 7,771,640, and 6,632,088, the disclosures of which are hereby incorporated by reference. The structures, features, applications, and methods of the above-identified references may be utilized with and/or incorporated into brackets 50 according to the present disclosure to the extent that doing so does not conflict with the express provisions of the present disclosure.

A bracket 50 according to the present disclosure may include (but is not required in all embodiments to include) an orientation-determining structure 90 and/or a transmitter 98. Orientation-determining structure 90 may be configured to detect and/or otherwise determine the orientation of archwire slot 72. This may include direct and/or indirect determination of the orientation of the archwire slot. Additionally or alternatively, this also may include determination of an absolute orientation of the archwire slot and/or determination of a relative orientation of the archwire slot, such as relative to a reference orientation thereof. Transmitter 98 may be configured to generate an orientation indication signal 99 that may be indicative of the orientation of the archwire slot relative to the reference orientation, such as may be determined by orientation-determining structure 90.

As discussed in more detail herein, orientation indication signal 99 may be utilized to determine, evaluate, correct, modify, and/or confirm an orthodontic treatment plan for the patient. For example, the orientation indication signal may be utilized to confirm that an archwire slot, or an archwire, is in a selected, or expected, orientation according to an existing treatment plan and/or responsive to a prior orthodontic adjustment. As another example, the orientation indication signal may be utilized to develop an original and/or updated/corrected orthodontic treatment plan for the patient, such as with the orientation indicated by the signal being evaluated, analyzed, compared to stored and/or previously obtained inputs, compared to expected inputs, inputted into prescription-defining software, inputted into orthodontic-bracket/tool/accessory-creating devices, etc. The orientation indication signal from a bracket 50 may be analyzed and/or otherwise utilized independent of the corresponding signals 99 from additional brackets 50 within the patient's mouth. Additionally or alternatively, the signals 99 from a plurality of brackets 50 may be analyzed or otherwise utilized together and/or concurrently.

Orientation-determining structure 90 may include any suitable structure that may be adapted, configured, designed, and/or constructed to determine the orientation of archwire slot 72, directly and/or indirectly. This may include any structure that may determine the absolute orientation of the archwire slot and/or the orientation of the archwire slot relative to the reference orientation thereof, relative to base 60, and/or relative to tooth 18. The orientation of the archwire slot additionally or alternatively may be referred to the position, relative position, rotational position, axial position, translational position, absolute position, etc. An example of an indirect determination includes determining the orientation of the body of the bracket relative to the base or other reference orientation, from which the orientation of the archwire passage is obtained due to the archwire passage extending in a defined, or fixed, orientation within the body.

As an example, orientation-determining structure 90 may include and/or be a rotation-determining structure that may be configured to determine a rotation of body 70 relative to base 60 to determine the orientation of archwire slot 72. This may include determining the rotation of body 70 relative to base 60 about the at least one rotational axis, about the at least two rotational axes, and/or about the three distinct rotational axes.

Additionally or alternatively, orientation-determining structure 90 may include and/or be a translation-determining structure that may be configured to determine a translation of body 70 relative to base 60 to determine the orientation of archwire slot 72. This may include determining the translation of body 70 relative to base 60 along the at least one translational axis, along the at least two translational axes, and/or along the three distinct translational axes.

As a more specific example, and as illustrated in FIG. 2, orientation-determining structure 90 may include one or more magnets 92 and at least one sensor 94. Sensor 94 may be configured to detect magnets 92 (or a location thereof and/or a proximity thereto) to determine the orientation of archwire slot 72 relative to the reference orientation. However, this is but a single example, and it is within the scope of the present disclosure that any suitable structure and/or devices may be utilized as, and/or as a part of, the orientation-determining structure 90. Thus, orientation-determining structure 90 may utilize any suitable sensor, detector, emitter, comparator, mechanism, inductor, capacitor, strain gauge, etc. to determine the orientation of the body relative to the base.

Returning more generally to FIGS. 1-2, the orientation of archwire slot 72 may be established and/or determined relative to any suitable reference orientation, and the reference orientation may be established and/or defined in any suitable manner. As examples, the reference orientation may be defined relative to base 60, relative to tooth 18, relative to a base of another bracket that is present within the patient's mouth 16, relative to another tooth that is present within the patient's mouth, relative to another archwire slot that is defined by the other bracket, and/or relative to a present and/or prior orientation of the archwire slot.

As another example, orthodontic bracket 50 may define a home position, and the reference orientation may be defined relative to, or may be, the home position. The home position may be any suitable position of body 70 relative to base 60. As examples, body 70 may define a range-of-motion relative to base 60, and the home position may be defined at an extreme of the range-of-motion or as a central point within the range-of-motion.

It is within the scope of the present disclosure that bracket 50 may include one or more visual indicators 96 that may visibly indicate when the bracket is in the home position. Examples of visual indicators 96 include any suitable coloration, gradation, line, crosshair, and/or alignment structure that may visually indicate that bracket 50 is (or is not) in the home position. Body 70 optionally may be biased to the home position, such as to automatically be urged toward and/or to the home position when the retention structure is in an unlocked configuration.

Bracket 50 additionally or alternatively may include a physical, or tactile, indicator 97 that frictionally urges, or is configured to frictionally urge, the body to stop further adjustment in a given direction when forces are imparted to the body to move the body to, and potentially beyond, the home position. Thus, this increased friction may be felt or otherwise detected to indicate the home position. Any suitable projection, rib, index, detent, surface treatment, etc. may be utilized to provide such a tactile indicator.

Transmitter 98 may include any suitable structure that may be configured to generate orientation indication signal 99. As examples, transmitter 90 may include and/or be a wireless transmitter, a Bluetooth (and/or Bluetooth LE) transmitter, an RFID transmitter, an RFID tag, a digital transmitter, an analog transmitter, an active transmitter, a passive transmitter, a passive transponder, and/or an optical transmitter. The transmitter may transmit any suitable orientation indication signal, including a wireless orientation indication signal and/or a wired orientation indication signal. When the orientation indication signal includes the wired orientation indication signal, transmitter 90 may be configured to directly connect to bracket 50 and/or to transfer the wired orientation signal from the bracket to the electronic device via any suitable electrical and/or communication linkage.

As discussed in more detail herein, transmitter 98 may be configured to transmit orientation indication signal 99 to an electronic device that may be utilized with, and/or may form a portion of, an overall orthodontic appliance system 20 that includes bracket 50. Examples of the electronic device include any suitable computer, laptop computer, desktop computer, tablet, computerized orthodontic machine or system, computing device, handheld electronic device, wearable electronic device, and/or electronic orthodontic adjustment tool.

As illustrated in dashed lines in FIGS. 1-2, bracket 50 optionally may include a receiver 76 and/or a drive structure 78. Receiver 76 may be configured to receive an orientation control signal 77, which also may be referred to herein as a desired orientation signal 77, from any suitable source. This may include receiving the orientation control signal from another component of orthodontic appliance system 20, such as the electronic device, as discussed in more detail herein.

Regardless of the source of orientation control signal 77, receiver 76 may be configured to convey the orientation control signal to drive structure 78. Drive structure 78 then may be configured to selectively regulate, produce, and/or otherwise enable relative motion between body 70 and base 60 such that the orientation of the archwire slot relative to the reference orientation (or the orientation of body 70 relative to base 60) is varied. This variation may be based, at least in part, on the orientation control signal. Stated another way, and upon receipt of the orientation control signal, drive structure 78 may be configured to change the orientation of the archwire slot such that the orientation of the archwire slot corresponds to a desired orientation, with the desired orientation being indicated by the orientation control signal.

Drive structure 78 may include and/or be in communication with any suitable actuator and/or power source, which may be an electrical power source and/or a battery. The actuator may include an electronic actuator and/or a piezoelectric actuator, as examples. Drive structure 78 optionally may include any suitable motor, gear assembly, piston(s), pump(s), bladder(s), etc. As indicated in dash-dot lines in FIG. 2, at least a portion of the drive structure, when present, may be external the bracket and in communication with the bracket when the drive structure is utilized to adjust the orientation of the body. For example, at least a power source, actuator, and/or motor may be selectively connected to the bracket when the drive structure is to be used to adjust the orientation of the archwire slot and/or body relative to the base or other reference location. Other portions of the drive structure optionally may be part of the bracket that are not selectively removed, such as gears, fluid conduits, clutches, catches, etc.

FIGS. 3-4 are schematic representations of electronic orthodontic adjustment tools 100 according to the present disclosure. Electronic orthodontic adjustment tool 100 also may be referred to herein as an orthodontic adjustment tool 100, as an automatic adjustment tool 100, as an adjustment tool 100, and/or as a tool 100. Tool 100 may be adapted, configured, designed, sized, and/or constructed to selectively adjust an orientation of an archwire slot 72 that is defined by an orthodontic bracket 50. This may include adjusting the orientation of the archwire slot relative to a reference orientation thereof, as discussed herein.

Tool 100 may form a portion of and/or be utilized with an orthodontic appliance system 20 that includes and/or utilizes brackets 50 of FIGS. 1-2. Thus, brackets 50 of FIGS. 3-4 may include and/or utilize any suitable structure, function, and/or feature that is discussed herein with reference to brackets 50 of FIGS. 1-2. However, this is not required. As examples, tool 100 may be used with adjustable orthodontic brackets that do not include and/or utilize orientation-determining structure 90, transmitter 98, receiver 76, and/or drive structure 78.

Tool 100 includes an engagement structure 110. Engagement structure 110 may be configured to directly operatively engage orthodontic bracket 50 and/or to indirectly operatively engage orthodontic bracket 50 to selectively adjust the orientation of the archwire slot. This may include operative engagement with any suitable portion of orthodontic bracket 50 and/or of archwire 40. As an example, and as illustrated in FIG. 3, engagement structure 110 may be configured to be inserted into (or to directly and operatively engage) archwire slot 72. This may include insertion of the engagement structure into the archwire slot subsequent to removal of a corresponding archwire from the archwire slot and/or while the corresponding archwire extends within the archwire slot.

As another example, engagement structure 110 may engage any suitable portion and/or surface of body 70. Examples of suitable portions of body 70 include an edge, edge regions, and/or perimeter of the body, one or more sockets on and/or that extend within the body, one or more receivers on/in the body, etc.

As yet another example, and as illustrated in FIG. 4, engagement structure 110 may be configured to directly and operatively engage archwire 40 while archwire 40 extends within archwire slot 72. Under these conditions, engagement structure 110 may be referred to herein as indirectly and operatively engaging orthodontic bracket 50.

Engagement structure 110 may include and/or be any suitable structure that is configured to operatively engage bracket 50. As examples, the engagement structure may include and/or be a projection that extends from tool 100, a replaceable engagement structure, a removable engagement structure, an autoclavable engagement structure, and/or a resilient engagement structure.

As illustrated in dashed lines in FIGS. 3-4, tool 100 further may include an engagement indicator 120. Engagement indicator 120 may be configured to selectively indicate when tool 100 (or engagement structure 110 thereof) is engaged with, operatively engaged with, and/or properly engaged with orthodontic bracket 50 and/or with archwire 40. This may include providing feedback to indicate the engagement of tool 100 and bracket 50. As an example, engagement indicator 120 may include and/or be an engagement indicator LED 122 that may be configured to selectively change color and/or to selectively transition between an on state and an off state responsive to engagement of tool 100 with bracket 50.

As another example, engagement indicator 120 may include and/or be an engagement transmitter 124 that is configured to generate and/or transmit an engagement indication signal 126 responsive to tool 100 being engaged with orthodontic bracket 50. When engagement indicator 120 generates engagement indication signal 126, the engagement indication signal may be received by an electronic device 30 that forms a portion of an overall orthodontic appliance system 20, as discussed herein. Examples of engagement transmitter 124 include any suitable wireless transmitter and/or Bluetooth transmitter.

As also illustrated in dashed lines in FIGS. 3-4, tool 100 further may include an orientation-determining structure 130. Orientation-determining structure 130 may be adapted, configured, designed, and/or constructed to determine the orientation of archwire slot 72 when tool 100 is operatively engaged with bracket 50. This may include determining the orientation of the archwire slot relative to the reference orientation thereof and may be accomplished in any suitable manner, including those disclosed herein.

As further illustrated in dashed lines in FIGS. 3-4, tool 100 also may include an orientation transmitter 140. Orientation transmitter 140 may be configured to generate an orientation indication signal 142 that is indicative of the orientation of archwire slot 72. The orientation transmitter may include and/or be any suitable structure, such as a wireless transmitter, a Bluetooth transmitter, and/or a wired transmitter. When tool 100 includes orientation transmitter 140, the orientation transmitter may be configured to transmit the orientation indication signal to an electronic device that is utilized with and/or forms a portion of an overall orthodontic appliance system 20, as discussed herein.

The orientation transmitter 140 may transmit any suitable orientation indication signal 142, including a wireless orientation indication signal and/or a wired orientation indication signal. When the orientation indication signal includes the wired orientation indication signal, transmitter 90 may be configured to directly connect to bracket 50 and/or to transfer the wired orientation signal from the bracket to the electronic device via any suitable electrical and/or communication linkage.

Also as illustrated in dashed lines in FIGS. 3-4, tool 100 also may include an orientation receiving structure 150. Orientation receiving structure 150 may be configured to receive an orientation indication signal 99. The orientation indication signal may be generated by any suitable source, such as by bracket 50, as discussed herein.

As further illustrated in dashed lines in FIG. 3, tool 100 also may include and/or communicate with an orientation indicator 160. Orientation indicator 160 may be configured to indicate the orientation of archwire slot 72 and/or the orientation of the archwire slot relative to the reference orientation.

Orientation indicator 160 may include any suitable structure. As an example, orientation indicator 160 may include and/or be a display 162. Display 162 may display any suitable orientation, orientation information, and/or parameter that is, or that is indicative of, the orientation of the archwire slot and/or the orientation of the archwire slot relative to the reference orientation. As an example, display 162 may display a present orientation of the archwire slot.

As another example, display 162 may display an orientation difference, or orientation delta, that is indicative of a difference between the present orientation of the archwire slot and a desired orientation of the archwire slot. As yet another example, display 162 may display an orientation difference that is indicative of a difference between the present orientation of the archwire slot and an initial orientation of the archwire slot. As more specific examples, display 162 may display a tip parameter that is indicative of a tip force that will be applied to the tooth by an archwire for a given relative orientation of archwire slot 72, a torque parameter that is indicative of a torque force that will be applied to the tooth by an archwire for a given relative orientation of archwire slot 72, and/or a rotation parameter that is indicative of a rotation force that will be applied to the tooth by an archwire for a given relative orientation of archwire slot 72.

As used herein, the phrase, "indicative of" may be interpreted to mean that a given process, parameter, variable, and/or value (such as information that may be displayed by display 162) is correlated to, is based upon, corresponds to, and/or is associated with another process, parameter, variable, and/or value (such as the forces that will be applied to the tooth by the archwire). As an example, display 162 may display the actual force(s) that will be applied to the tooth by the archwire. As another example, display 162 may display an angle of the archwire slot, with this angle corresponding to a given bend of the archwire and therefore to the actual force(s) that will be applied to the tooth by the archwire when the archwire extends within the archwire slot.

Tool 100 may be configured to receive an orientation control signal 77 that is indicative of a desired orientation of the archwire slot. Under these conditions, orientation indicator 160 may be configured to indicate when the archwire slot is at the desired orientation. As an example, orientation indicator 160 may include and/or be an orientation indicator LED 164 that may be configured to selectively change color and/or to selectively transition between an on state and an off state (or vice versa) to indicate when the archwire slot is at the desired orientation. Additionally or alternatively, orientation indicator 160 also may be configured to emit a vibration and/or to emit a sound when the archwire slot is at the desired orientation.

As also illustrated in dashed lines in FIG. 3, tool 100 further may include a drive structure 170. Drive structure 170 may be configured to selectively regulate and/or change the orientation of archwire slot 72 when tool 100 is operatively engaged with bracket 50. As examples, drive structure 170 may regulate the orientation of the archwire slot based, at least in part, on orientation indication signal 142, orientation control signal 77, a comparison of orientation indication signal 142 to orientation control signal 77, and/or a comparison of a current orientation of the archwire slot to a desired orientation of the archwire slot.

Drive structure 170 may include and/or be any suitable structure. As examples, drive structure 170 may include an actuator, an electronic actuator, an electric motor, and/or a piezoelectric actuator.

As illustrated in dashed lines in FIGS. 3-4, tool 100 also may include a mount 180 that is configured to operatively attach tool 100 to electronic device 30, when utilized. Mount 180 may include and/or be a mechanical mount 180 that is configured to mechanically interlock tool 100 and electronic device 30, such as to facilitate concurrent use and/or handling thereof. Additionally or alternatively, mount 180 also may include and/or be a communication mount 180 that is configured to transfer one or more signals, such as orientation control signal 77, orientation indication signal 99, engagement indication signal 126, and/or orientation indication signal 142 between tool 100 and electronic device 30. Under these conditions, mount 180 may include one or more communication conduits 182.

Figure 5:
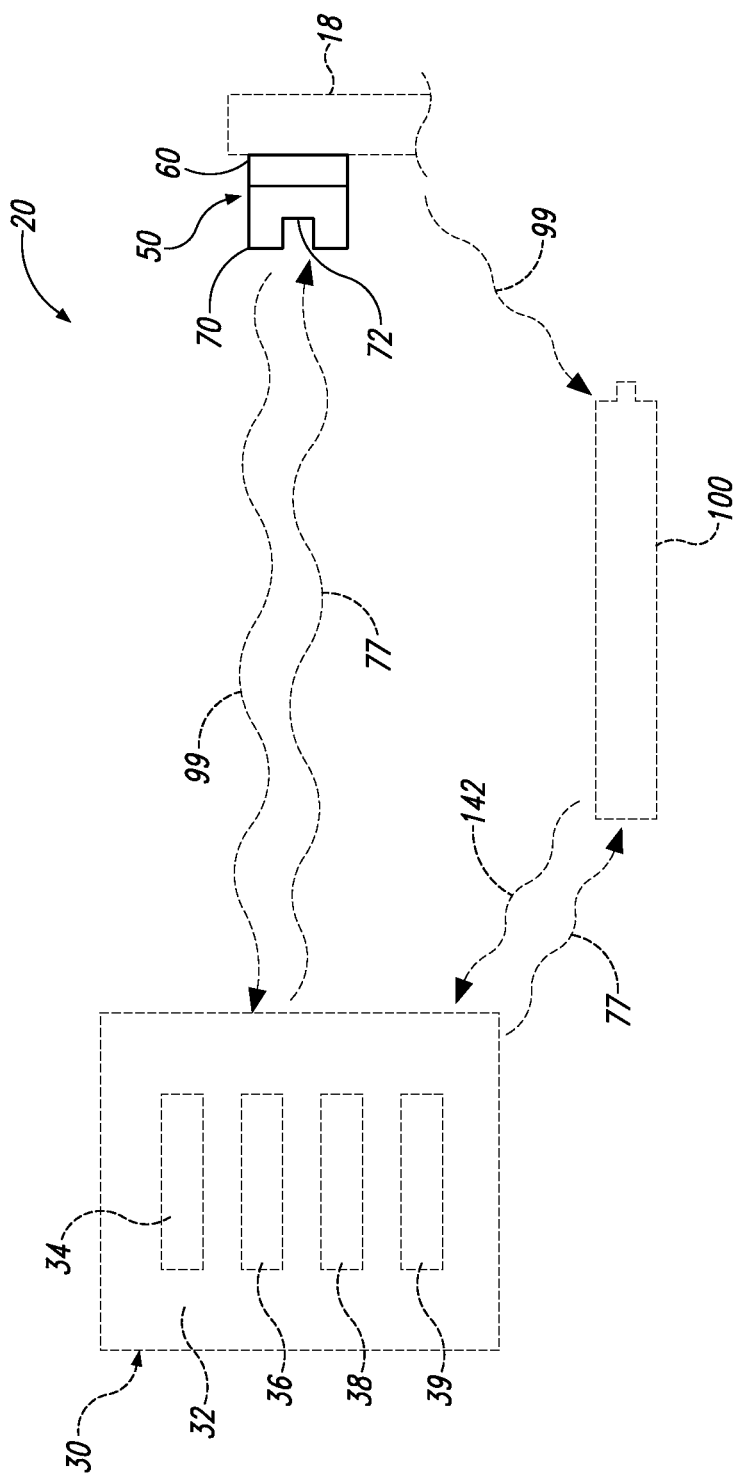
FIG. 5 is a schematic representation of an orthodontic appliance system according to the present disclosure.

FIG. 5 is a schematic representation of an orthodontic appliance system 20 according to the present disclosure. Orthodontic appliance system 20 includes an orthodontic bracket 50. In addition, orthodontic appliance system 20 also includes an electronic device 30 and/or an electronic orthodontic adjustment tool 100. Bracket 50 of FIG. 5 may include any suitable structure, function, and/or feature of brackets 50 of FIGS. 1-2. Similarly, tool 100 of FIG. 5 may include any suitable structure, function, and/or feature of tool 100 of FIGS. 3-4.

When system 20 includes electronic device 30, electronic device 30 may be configured to receive an orientation indication signal 99 from bracket 50 and/or to provide an orientation control signal 77 to bracket 50. When system 20 includes tool 100, bracket 50 may be configured to provide orientation indication signal 99 to tool 100. When system 20 includes both electronic device 30 and tool 100, electronic device 100 also may be configured to receive an orientation indication signal 142 from tool 100 and/or to provide orientation control signal 77 to tool 100.

Electronic device 30 and/or tool 100 may utilize the respective signals to adjust the relative orientation of archwire slot 72 and/or to control, regulate, and/or direct adjustment of the relative orientation of the archwire slot. This may include adjusting the orientation of the archwire slot by performing methods 200, which are discussed in more detail herein. Examples of electronic device 30 are disclosed herein.

Additionally or alternatively, electronic device 30 may include a display 32 that may be utilized by an orthodontist, or other orthodontic practitioner, while performing an orthodontic treatment utilizing system 20. As an example, display 32 may be configured to indicate and/or to display a current orientation 34 of a given archwire slot 72 and/or a parameter that is indicative of the current orientation of the given archwire slot. As another example, display 32 additionally or alternatively may be configured to indicate and/or to display a desired orientation 36 of the given archwire slot and/or a parameter that is indicative of the desired orientation of the given archwire slot.

As yet another example, display 32 additionally or alternatively may be configured to indicate and/or to display an orientation difference 38 of the given archwire slot and/or a parameter that is indicative of the orientation difference of the archwire slot. Orientation difference 38 also may be referred to herein as an orientation delta 36 and may be based upon, or may be, a difference between the desired orientation of the given archwire slot and the current orientation of the archwire slot. As another example, display 32 additionally or alternatively may be configured to indicate and/or to display an indicator 39. Indicator 39 may be configured to indicate when the given archwire slot reaches the desired orientation thereof.

Figure 6:
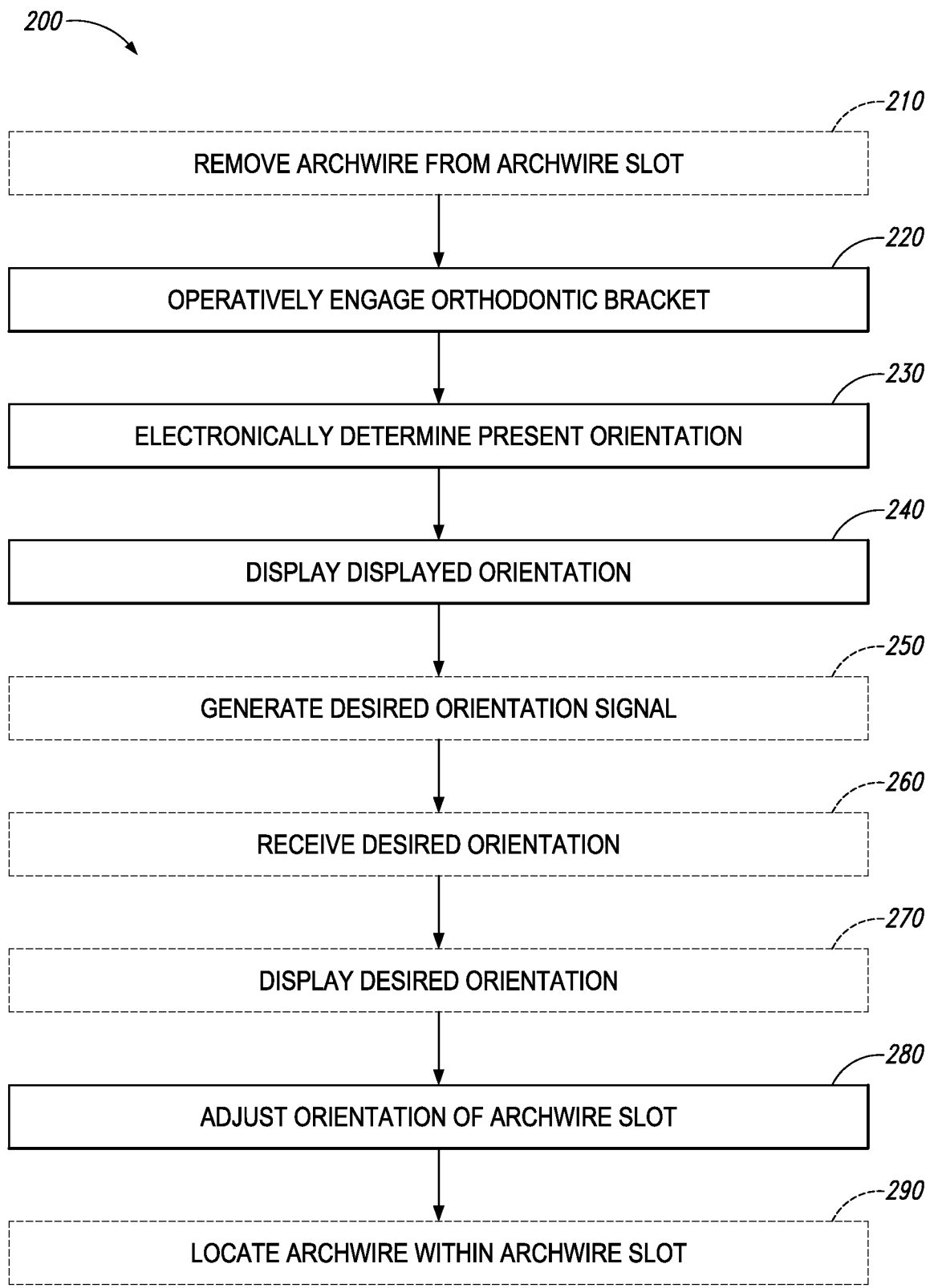
FIG. 6 is a flow chart depicting methods, according to the present disclosure, of adjusting an orthodontic bracket having an adjustable archwire passage.

FIG. 6 is a flow chart depicting methods 200, according to the present disclosure, of adjusting an orientation of an orthodontic bracket, which includes an archwire slot, while the orthodontic bracket is operatively attached to a patient's tooth. Methods 200 may include removing an archwire from the archwire slot at 210 and include operatively engaging the orthodontic bracket at 220. Methods 200 further include electronically determining a present orientation of the archwire slot at 230 and displaying a displayed orientation of the archwire slot at 240. Methods 200 further may include generating a desired orientation signal at 250, receiving a desired orientation at 260, and/or displaying the desired orientation at 270. Methods 200 further include adjusting the orientation of the archwire slot at 280 and may include locating an archwire within the archwire slot at 290.

Removing the archwire from the archwire slot at 210 may include removing the archwire from the archwire slot to permit and/or facilitate the operatively engaging at 220 and/or the adjusting at 280. As an example, and prior to the operatively engaging at 220, the archwire may be removed from the archwire slot to permit, or provide clearance for, an electronic orthodontic adjustment tool to operatively engage the archwire slot. As another example, and prior to the adjusting at 280, the archwire may be removed from the archwire slot to decrease a force required to be applied during the adjusting at 280 and/or to provide clearance for the electronic orthodontic adjustment tool to perform the adjusting at 280.

However, this is not required. As an example, methods 200 alternatively may include performing the operatively engaging at 220 and/or the adjusting at 280 while the archwire extends within the archwire slot (i.e., without performing the removing at 210).

Operatively engaging the orthodontic bracket at 220 may include operatively engaging the orthodontic bracket with an engagement structure of the electronic orthodontic adjustment tool. The operatively engaging at 220 may include directly and operatively engaging the orthodontic bracket. As an example, the operatively engaging may include directly and operatively engaging a body of the orthodontic bracket, which defines the archwire slot, and/or extending the engagement structure into the archwire slot (i.e., directly and operatively engaging the archwire slot). When the operatively engaging at 220 includes extending the engagement structure into the archwire slot, methods 200 may include the removing at 210; however, this is not required.

The operatively engaging at 220 additionally or alternatively may include directly and operatively engaging the engagement structure with the archwire while the archwire extends within the archwire slot. This may include directly and operatively engaging the archwire to indirectly and operatively engage the orthodontic bracket. When the operatively engaging at 220 includes directly and operatively engaging the archwire, methods 200 may not include the removing at 210 and/or the archwire may extend within the archwire slot during the operatively engaging at 220.

Electronically determining the present orientation of the archwire slot at 230 may include electrically determining an absolute orientation of the archwire slot, electronically determining the orientation of the archwire slot relative to a reference orientation, and/or electronically determining the orientation of the archwire slot at a given point in time. The given point in time may include and/or be a time at which the orientation of the archwire slot is determined and/or measured and/or a time at which the electronically determining is performed.

The electronically determining at 230 may be performed and/or accomplished in any suitable manner. As an example, the electronically determining at 230 may include receiving a current orientation indication signal with the electronic orthodontic adjustment tool. The current orientation indication signal may be indicative of the orientation of the archwire slot relative to the reference orientation at the given point in time. The receiving may include receiving the current orientation indication signal from a transmitter. The transmitter may form a portion of the orthodontic bracket, and the current orientation of the archwire slot may be determined by an orientation-determining structure of the orthodontic bracket.

Additionally or alternatively, the electronically determining at 230 also may include electronically determining the present orientation of the archwire slot with the electronic orthodontic adjustment tool. As an example, the electronic orthodontic adjustment tool may include an orientation-determining structure that may be utilized during, and/or that may perform, the electronically determining at 230.

The electronically determining at 230 may include electronically determining any suitable orientation and/or orientation parameter of the orthodontic bracket. As an example, the electronically determining at 230 may include electronically determining a rotation of the archwire slot relative to a reference rotation. This may include electronically determining the rotation about at least one, about at least two, and/or about at least three rotational axes. The three rotational axes may be orthogonal to one another.

As another example, the electronically determining at 230 additionally or alternatively may include electronically determining a translation of the archwire slot relative to a reference location. This may include electronically determining the translation of the archwire slot along at least one translational axis, along at least two translational axes, and/or along at least three translational axes. The three translational axes may be orthogonal to one another and/or may correspond to the three rotational axes; however, this is not required.

It is within the scope of the present disclosure that the electronically determining at 230 may include electronically determining in real-time and/or electronically determining with at least a threshold repeat frequency. Examples of the threshold repeat frequency include frequencies of at least 0.2 Hz, at least 0.5 Hz, at least 1 Hz, at least 2 Hz, at least 5 Hz, at least 10 Hz, at least 60 Hz, at least 100 Hz, at least 250 Hz, at least 500 Hz, and/or at least 1000 Hz.

Displaying the displayed orientation of the archwire slot at 240 may include displaying any suitable orientation, or orientation information, that is, or is indicative of, the orientation of the archwire slot and/or the orientation of the archwire slot relative to the reference orientation. The displayed orientation may include, be, and/or be based upon the present orientation that was determined during the electronically determining at 230. Similar to the electronically determining at 230, the displaying at 240 may include displaying in real-time and/or displaying with at least the threshold repeat frequency during at least a portion of methods 200. This may include repeating the displaying at 240 a plurality of times during methods 200 and/or repeating the displaying at 240 with at least the threshold repeat frequency.

The displayed orientation may include and/or be any suitable orientation and/or any suitable parameter that is indicative of the present orientation of the archwire slot. As an example, the displayed orientation may include and/or be the present orientation of the archwire slot. As another example, the displayed orientation may include and/or be an orientation difference, or orientation delta, that is indicative of a difference between the present orientation of the archwire slot and a desired orientation of the archwire slot. As another example, the displayed orientation may include and/or be an orientation difference, or orientation delta, that is indicative of a difference between the present orientation of the archwire slot and an initial orientation of the archwire slot. The initial orientation of the archwire slot may include and/or be an orientation of the archwire slot at the start of, or prior to performing, methods 200.

As additional examples, the displayed orientation may include and/or be a numerical value, an angle, and/or a distance. As examples, the displayed orientation may include and/or be a tip parameter that is indicative of a tip force that will be applied to the tooth by an archwire for a given relative orientation of the archwire slot, a torque parameter that is indicative of a torque force that will be applied to the tooth by an archwire for a given relative orientation of the archwire slot, and/or a rotation parameter that is indicative of a rotation force that will be applied to the tooth by an archwire for a given relative orientation of the archwire slot.

Additionally or alternatively, the displayed orientation also may include and/or be an indicator that includes an aligned indication and a misaligned indication. Under these conditions, the displaying at 240 may include displaying the aligned indication when the present orientation corresponds to, or is, the desired orientation and displaying the misaligned indication when the present location does not correspond to, or is not, the desired orientation.

Generating the desired orientation signal at 250 may include generating any suitable desired orientation signal that may be based upon, and/or may be indicative of, the desired orientation of the archwire slot. This may include generating the desired orientation signal with an electronic device, which may form a portion of an orthodontic appliance system that includes the electronic orthodontic adjustment tool, and/or with the electronic orthodontic adjustment tool. When methods 200 include the generating at 250, the adjusting at 280 may be, may be based upon, and/or may be based, at least in part, on the desired orientation signal.

Receiving the desired orientation at 260 may include receiving any suitable desired orientation with the electronic orthodontic adjustment tool. As discussed, the desired orientation may include, may be indicative of, may correspond to, and/or may be a desired orientation of the archwire slot and/or the desired orientation of the archwire slot relative to the reference orientation. When methods 200 include the receiving at 260, the adjusting at 280 may include adjusting based, at least in part, on the desired orientation that was received during the receiving at 260.

The receiving at 260 may include receiving the desired orientation in any suitable manner. As an example, the receiving at 260 may include receiving a manual user input with the electronic orthodontic adjustment tool. As another example, the receiving at 260 may include receiving the desired orientation signal that was generated during the generating at 250. This may include receiving the desired orientation signal with the electronic orthodontic adjustment tool and/or transmitting the desired orientation signal from the electronic device to the electronic orthodontic adjustment tool subsequent to manual user input of the desired orientation into the electronic device. Under these conditions, the electronic orthodontic adjustment tool may include a drive structure, and the adjusting at 280 may include adjusting, with the drive structure of the electronic orthodontic adjustment tool, based, at least in part, on the desired orientation and/or on the desired orientation signal.

As another example, the receiving at 260 additionally or alternatively may include receiving the desired orientation and/or the desired orientation signal with the orthodontic bracket. Under these conditions, the orthodontic bracket may include a drive structure and the adjusting at 280 may include adjusting, with the drive structure of the orthodontic bracket, based, at least in part, on the desired orientation and/or on the desired orientation signal.

Displaying the desired orientation at 270 may include displaying the desired orientation in any suitable manner. As an example, the displaying at 270 may include displaying the desired orientation and/or a parameter that is indicative of the desired orientation on, with, and/or on a display of the electronic device. As another example, the displaying at 270 additionally or alternatively may include displaying the desired orientation and/or a parameter that is indicative of the desired orientation on, with, and/or on a display of the electronic orthodontic adjustment tool. As yet another example, the displaying at 270 additionally or alternatively may include displaying with at least the threshold repeat frequency, which is discussed herein.

Adjusting the orientation of the archwire slot at 280 may include adjusting based, at least in part, on the displayed orientation that is displayed during the displaying at 240 and/or on the desired orientation that is displayed during the displaying at 270. This may include changing the orientation of the archwire slot relative to the reference orientation.

Additionally or alternatively, methods 200 may include utilizing a computer and/or an algorithm to calculate and/or determine a target orientation for the archwire slot. Under these conditions, the target orientation for the archwire slot may be calculated and/or determined based, at least in part, on the electronically determining at 230 and/or on repeating the electronically determining at 230 for a plurality of, or even every, orthodontic bracket that is present within the patient's mouth. In addition, the adjusting at 280 may include adjusting such that the orientation of the archwire slot corresponds to, or is, the target orientation of the archwire slot that was calculated and/or determined by the computer and/or algorithm.

It is within the scope of the present disclosure that the adjusting at 280 may be accomplished in any suitable manner. As an example, the adjusting at 280 may include electronically adjusting the orientation of the archwire slot, such as by utilizing a drive structure of the electronic orthodontic adjustment tool and/or a drive structure of the orthodontic bracket. Under these conditions, methods 200 further may include electrically providing a motive force for the adjusting at 280. The motive force may be electrically provided with the drive structure of the electronic orthodontic adjustment tool and/or with the drive structure of the orthodontic bracket.

As another example, the adjusting at 280 additionally or alternatively may include manually adjusting the orientation of the archwire slot. Under these conditions, methods 200 further may include manually providing the motive force for the adjusting at 280 with the electronic orthodontic adjustment tool. As a more specific example, an orthodontist, a technician, and/or another operator may manually adjust the orientation of the archwire slot while using the displayed orientation as feedback to indicate when the desired orientation for the archwire slot has been reached.

Regardless of the exact mechanism, it is within the scope of the present disclosure that the adjusting at 270 may include adjusting with or without the archwire being received within the archwire slot. In slightly different terms, the adjusting at 270 may be performed without an archwire in the archwire slot, such as by a previously inserted archwire being removed from the archwire slot prior to the adjusting. However, it is not a requirement to all brackets, methods, tools, etc. according to the present disclosure that the archwire be removed prior to the adjusting, and in some embodiments, the adjusting may occur while an archwire is present within the archwire slot, as discussed herein.

As discussed, methods 200 may, but are not required to, include removing the archwire from the archwire slot at 210. When methods 200 include the removing at 200, methods 200 further may include locating the archwire within the archwire slot at 290. This may include locating the archwire within the archwire slot to apply, or to initiate application of, prescriptive forces to the tooth to which the orthodontic bracket is attached. It is within the scope of the present disclosure that the locating at 290 may include locating the archwire that was removed during the removing at 210. Alternatively, the locating at 290 also may include locating another, or a different, archwire within the archwire slot.

Methods 200 are discussed herein in the context of operatively engaging (at 220), electronically determining an orientation of (at 230), displaying the orientation of (at 240), and adjusting the orientation of (at 280) a single orthodontic bracket. However, and as discussed herein, a patient's mouth generally includes a plurality of orthodontic brackets, each attached to a corresponding tooth, and which may be utilized as part of an overall orthodontic treatment plan. With this in mind, it is within the scope of the present disclosure that any suitable portion of methods 200 may be repeated, during a given orthodontic adjustment session, for a subset of the plurality of orthodontic brackets, or even for every orthodontic bracket, that is present within the patient's mouth. This may include repeating at least the operatively engaging at 220, the electronically determining at 230, the displaying at 240, and the adjusting at 280 for each of the subset of the plurality of orthodontic brackets to adjust the prescription of each of the subset of the plurality of orthodontic brackets as part of the overall orthodontic treatment plan. The subset of the plurality of orthodontic brackets may include at least 2, at least 4, at least 6, at least 8, at least 10, at least 12, at least 14, at least 16, at least 18, or at least 20 orthodontic brackets.

Additionally or alternatively, orthodontic treatment plans generally are progressive and/or sequential in nature, with a plurality of different orthodontic adjustments, which are separated in time, being utilized to progressively move one or more teeth from an initial occlusion to a desired, or final, occlusion. With this in mind, it is within the scope of the present disclosure that methods 200 may be repeated to adjust a given orthodontic bracket a plurality of times. As an example, methods 200 may be performed a first time to provide a first, or initial, orientation of the archwire slot of the given orthodontic bracket. Subsequently, the archwire may be utilized to apply one or more prescriptive forces to a given tooth to which the given orthodontic bracket is operatively attached for a first treatment time. Then, methods 200 may be repeated to provide a second orientation of the archwire slot of the given orthodontic bracket. Subsequently, the archwire may be utilized to apply one or more (different) prescriptive forces to the given tooth for a second treatment time. This process may be repeated any suitable number of times until the given tooth has been moved to the desired occlusion.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

Examples of systems, brackets, tools, and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. An orthodontic bracket, comprising:
a base configured to be operatively affixed to a tooth that is present within a patient's mouth;
a body that is configured to be selectively repositioned relative to the base and at least partially defines an archwire slot that is shaped to receive an archwire;
a retention structure configured to be selectively transitioned between:
(i) a locked configuration in which an orientation of the archwire slot relative to a reference orientation is at least substantially fixed; and
(ii) an unlocked configuration in which the retention structure permits the orientation of the archwire slot relative to the reference orientation to be adjusted;
optionally an orientation-determining structure configured to determine the orientation of the archwire slot relative to the reference orientation; and
optionally a transmitter configured to generate an orientation indication signal that is indicative of the orientation of the archwire slot relative to the reference orientation.

A1.1. The bracket of paragraph A1, wherein the body is configured for selective adjustment relative to the base.

A1.1.1 The bracket of any of paragraphs A1-A1.1, wherein the body is configured for selective rotation relative to the base about at least one, optionally at least two, and further optionally at least three rotational axes.

A1.1.2 The bracket of any of paragraphs A1-A1.11., wherein the body is configured for selective translation relative to the base about at least one, optionally at least two, and further optionally at least three translational axes.

A1.2. The bracket of paragraph A1 or A 1.1.2, wherein the bracket further includes an adjustment mechanism configured to selectively adjust the orientation of the body relative to the base and thereby adjust the orientation of the archwire slot relative to the base.

A1.3. The bracket of paragraph A1.2, wherein the retention structure is adapted to selectively restrict adjustment of the orientation of the body relative to the base.

A2. The bracket of any of paragraphs A1-A1.3, wherein the orientation-determining structure includes a magnet (optionally a plurality of magnets) and a sensor configured to determine a location of the magnet (optionally the plurality of magnets) relative thereto to determine the orientation of the archwire slot relative to the reference orientation.

A3. The bracket of any of paragraphs A1-A2, wherein the orientation-determining structure includes a rotation-determining structure configured to determine a rotation of the body relative to the base about at least one axis, optionally at least two axes, and further optionally three axes, to determine the orientation of the archwire slot relative to the reference orientation.

A4. The bracket of any of paragraphs A1-A3, wherein the orientation-determining structure includes a translation-determining structure configured to determine a translation of the body relative to the base about at least one axis, optionally at least two axes, and further optionally three axes, to determine the orientation of the archwire slot relative to the reference orientation.

A5. The bracket of any of paragraphs A1-A4, wherein the reference orientation is defined relative to at least one of (i) the base, (ii) the tooth, (iii) a base of another bracket that is present within the patient's mouth, (iv) another tooth that is present within the patient's mouth; and (v) another archwire slot that is defined by the other bracket that is present within the patient's mouth.

A6. The bracket of any of paragraphs A1-A5, wherein the bracket defines a home position, and further wherein the reference orientation is defined relative to, and optionally is, the home position.

A7. The bracket of paragraph A6, wherein the bracket further includes a visual indicator that indicates when the orthodontic bracket is in the home position.

A8. The bracket of any of paragraphs A1-A7, wherein the transmitter includes at least one of a wireless transmitter, a Bluetooth transmitter, an RFID transmitter, an RFID tag, a digital transmitter, an analog transmitter, and an optical transmitter.

A9. The bracket of any of paragraphs A1-A8, wherein the transmitter is configured to transmit the orientation indication signal to an electronic device.

A9.1 The bracket of paragraph A9, wherein the electronic device includes at least one of a computer, a laptop computer, a desktop computer, a tablet, a computerized orthodontic machine or system, a computing device, a handheld electronic device, a wearable electronic device, and an electronic orthodontic adjustment tool.

A9.2 The bracket of any of paragraphs A9-A9.1, wherein the transmitter is configured to wirelessly transmit the orientation indication signal to the electronic device.

A9.3 The bracket of any of paragraphs A9-A9.2, wherein the electronic device is configured to directly connect to the bracket, and further wherein the transmitter is configured to transmit a wired orientation indication signal to the electronic device.

A10. The bracket of any of paragraphs A1-A9.3, wherein the bracket further includes a receiver configured to receive an orientation control signal and a drive structure configured to selectively regulate the orientation of the archwire slot relative to the reference orientation based, at least in part, on the orientation control signal.

A11. The bracket of any of paragraphs A1-A10, wherein the bracket further includes any suitable structure and/or feature disclosed in U.S. patent application Ser. No. 14/559,100 and/or in U.S. Patent Application Publication No. 2014/0272751.

A12. The bracket of any of paragraphs A1-A11, wherein the bracket further includes a ligature configured to retain the archwire within the archwire slot.

A12.1 The bracket of paragraph A12, wherein the ligature is operatively attached to the bracket.

A12.2 The bracket of any of paragraphs A12-A12.1, wherein the bracket is a self-ligating bracket, and further wherein the ligature forms a portion of the bracket.

A13. An orthodontic appliance system, comprising: the bracket of any of paragraphs A1-A12.2; and an/the electronic device configured to receive the orientation indication signal from the bracket.

A13.1 The system of paragraph A13, wherein the electronic device is further configured to provide an/the orientation control signal to the bracket.

B1. An electronic orthodontic adjustment tool configured to selectively adjust an orientation of an archwire slot that is defined by an orthodontic bracket, which optionally is the orthodontic bracket of any of paragraphs A1-A13.1, relative to a reference orientation while the orthodontic bracket is operatively attached to a patient's tooth, the tool comprising: an engagement structure configured to operatively engage the orthodontic bracket to selectively adjust the orientation of the archwire slot relative to the reference orientation;
an orientation-determining structure configured to electronically determine the orientation of the archwire slot relative to the reference orientation; and
an orientation indicator configured to indicate the orientation of the archwire slot relative to the reference orientation.

B2. The tool of paragraph B1, wherein the tool includes an engagement indicator configured to selectively indicate when the tool is properly engaged with the orthodontic bracket, optionally wherein the engagement indicator includes an engagement indicator LED, and further optionally wherein the engagement indicator includes an engagement transmitter configured to transmit an engagement indication signal responsive to the tool being properly engaged with the orthodontic bracket.

B3. The tool of any of paragraphs B1-B2, wherein the tool further includes an orientation transmitter configured to generate an orientation indication signal, optionally wherein the orientation transmitter includes at least one of a wireless transmitter and a Bluetooth transmitter.

B4. The tool of paragraph B3, wherein the orientation transmitter is configured to transmit the orientation indication signal to an electronic device that is associated with the electronic orthodontic adjustment tool.

B4.1 The tool of paragraph B4, wherein the electronic device includes at least one of a computer, a laptop computer, a desktop computer, a tablet, a computerized orthodontic machine or system, a computing device, a handheld electronic device, a wearable electronic device, and an electronic orthodontic adjustment tool.

B4.2 The tool of any of paragraphs B4-B4.1, wherein the transmitter is configured to wirelessly transmit the orientation indication signal to the electronic device.

B4.3 The tool of any of paragraphs B4-B4.2 wherein the electronic device is configured to directly connect to the tool, and further wherein the transmitter is configured to transmit a wired orientation indication signal to the electronic device.

B5. The tool of any of paragraphs B1-B4.3, wherein the orientation indicator includes a display that displays at least one, optionally at least two, and further optionally all, of:
(i) a tip parameter that is indicative of a tip force that will be applied to the tooth by an archwire for a given relative orientation of the archwire slot;
(ii) a torque parameter that is indicative of a torque force that will be applied to the tooth by the archwire for the given relative orientation of the archwire slot; and
(iii) a rotation parameter that is indicative of a rotational force that will be applied to the tooth by the archwire for the given relative orientation of the archwire slot.

B6. The tool of any of paragraphs B1-B5, wherein the tool is configured to receive an orientation control signal indicative of a desired orientation of the archwire slot relative to the reference orientation, and further wherein the orientation indicator is configured to indicate when the archwire slot is at the desired orientation, and optionally wherein the orientation indicator includes an orientation indicator LED.

B7. The tool of any of paragraphs B1-B6, wherein the tool further includes a drive structure configured to selectively regulate the orientation of the archwire slot relative to the reference orientation, optionally based at least in part on at least one of:

(i) a/the orientation indication signal;
(ii) a/the orientation control signal;
(iii) a comparison of the orientation indication signal to the orientation control signal; and
(iv) a comparison of a current orientation of the archwire slot relative to the reference orientation to a/the desired orientation of the archwire slot relative to the reference orientation.

B8. The tool of any of paragraphs B1-B7, wherein the engagement structure is at least one of (i) a replaceable engagement structure, (ii) a removable engagement structure, (iii) an autoclavable engagement structure, and (iv) a resilient engagement structure.

B9. The tool of any of paragraphs B1-B8, wherein the engagement structure is configured to be inserted into the archwire slot to directly and operatively engage the orthodontic bracket.

B10. The tool of any of paragraphs B1-B9, wherein the engagement structure is configured to directly and operatively engage the archwire, while the archwire extends within the archwire slot, to indirectly and operatively engage the orthodontic bracket.

B11. An orthodontic appliance system, comprising: the tool of any of paragraphs B1-B10; and the orthodontic bracket.

B12. The system of paragraph B11, wherein the orthodontic bracket includes the orthodontic bracket of any of paragraphs A1-A12.2.

B13. The system of any of paragraphs B11-B12, wherein the orthodontic bracket is configured to provide an/the orientation indication signal to the tool.

B14. The system of any of paragraphs B11-B13, wherein the system further includes an/the electronic device configured to at least one of:

(i) receive an/the orientation indication signal from the orthodontic bracket;
(ii) receive the orientation indication signal from the tool;
(iii) provide an/the orientation control signal to the tool; and
(iv) provide the orientation control signal to the orthodontic bracket.

C1. A method of adjusting an orthodontic bracket that includes an archwire slot while the orthodontic bracket is operatively attached to a patient's tooth, the method comprising:

operatively engaging the orthodontic bracket with an engagement structure of an electronic orthodontic adjustment tool;

electronically determining a present orientation of the archwire slot relative to a reference orientation at a given point in time;

displaying a displayed orientation of the archwire slot with the electronic orthodontic adjustment tool, wherein the displayed orientation is based, at least in part, on the present orientation; and adjusting the orientation of the archwire slot relative to the reference orientation based, at least in part, on the displaying.

C2. The method of paragraph C1, wherein the operatively engaging includes directly and operatively engaging the engagement structure with the orthodontic bracket, and optionally a body of the orthodontic bracket that defines the archwire slot.

C3. The method of any of paragraphs C1-C2, wherein the operatively engaging includes extending the engagement structure within the archwire slot.

C4. The method of any of paragraphs C1-C3, wherein the operatively engaging includes directly and operatively engaging the engagement structure with an archwire that extends within the archwire slot to indirectly and operatively engage the orthodontic bracket.

C5. The method of any of paragraphs C1-C4, wherein the electronically determining includes receiving a current orientation indication signal, which is indicative of the orientation of the archwire slot relative to the reference orientation at the given point in time, with the electronic orthodontic adjustment tool.

C5.1. The method of paragraph C5, wherein the receiving includes receiving from a transmitter of the orthodontic bracket.

C6. The method of any of paragraphs C1-C5, wherein the electronically determining includes electronically determining with the electronic orthodontic adjustment tool, and optionally with an orientation-determining structure of the electronic orthodontic adjustment tool.

C7. The method of any of paragraphs C1-C6, wherein the electronically determining includes electronically determining a rotation of the archwire slot relative to a reference rotation, optionally about at least one rotational axis, about at least two rotational axes, or about at least three rotational axes.

C8. The method of any of paragraphs C1-C7, wherein the electronically determining includes electronically determining a translation of the archwire slot relative to a reference location, optionally along at least one translational axis, along at least two translational axes, or along at least three translational axes.

C9. The method of any of paragraphs C1-C8, wherein the displayed orientation is the present orientation.

C10. The method of any of paragraphs C1-C9, wherein the displayed orientation is indicative of a difference between the present orientation and a desired orientation of the archwire slot.

C11. The method of any of paragraphs C1-C10, wherein the displayed orientation is indicative of a difference between the present orientation and an initial orientation.

C12. The method of any of paragraphs C1-C11, wherein the displayed orientation includes at least one of a numerical value, a distance, and an angle.

C13. The method of any of paragraphs C1-C12, wherein the displayed orientation includes an indicator that includes an aligned indication and a misaligned indication, wherein the displaying includes displaying the aligned indication when the present orientation corresponds to a/the desired orientation of the archwire slot, and further wherein the displaying includes displaying the misaligned indication when the present orientation does not correspond to the desired orientation.

C14. The method of any of paragraphs C1-C13, wherein the adjusting includes changing the orientation of the archwire slot relative to the reference orientation.

C15. The method of any of paragraphs C1-C14, wherein the adjusting includes electronically adjusting.

C16. The method of any of paragraphs C1-C15, wherein the adjusting includes manually adjusting.

C17. The method of any of paragraphs C1-C16, wherein the method includes providing a motive force for the adjusting with the electronic orthodontic adjustment tool.

C18. The method of any of paragraphs C1-C17, wherein the method includes providing a motive force for the adjusting with the orthodontic bracket.

C19. The method of any of paragraphs C1-C18, wherein the electronically determining and the displaying include electronically determining and displaying in real-time, optionally wherein the method further includes repeating the receiving and the displaying with at least a threshold repeat frequency of at least 0.2 Hz, at least 0.5 Hz, at least 1 Hz, at least 2 Hz, at least 5 Hz, at least 10 Hz, at least 60 Hz, at least 100 Hz, at least 250 Hz, at least 500 Hz, or at least 1000 Hz.

C20. The method of any of paragraphs C1-C19, wherein the method further includes receiving a/the desired orientation with the electronic orthodontic adjustment tool, wherein the desired orientation is indicative of a desired orientation of the archwire slot relative to the reference orientation.

C20.1 The method of paragraph C20, wherein the receiving includes receiving a manual user input.

C20.2 The method of any of paragraphs C20-C20.1, wherein the receiving includes receiving a desired orientation signal.

C20.3 The method of any of paragraphs C20-C20.2, wherein the adjusting includes adjusting based, at least in part, on the desired orientation.

C20.4 The method of any of paragraphs C20-C20.3, wherein the method further includes displaying the desired orientation on the electronic orthodontic adjustment tool.

C20.5 The method of any of paragraphs C20-C20.4, wherein the method further includes generating a/the desired orientation signal with the electronic orthodontic adjustment tool, wherein the desired orientation signal is based, at least in part, on the desired orientation.

C20.5.1 The method of paragraph C20.5, wherein the adjusting includes adjusting based, at least in part, on the desired orientation signal.

C20.5.2 The method of any of paragraphs C20.5-C20.5.1, wherein the method further includes receiving the desired orientation signal with the orthodontic bracket, wherein the orthodontic bracket includes a drive structure, and further wherein the adjusting includes adjusting with the drive structure based, at least in part, on the desired orientation signal.

C20.5.3 The method of any of paragraphs C20.5-C20.5.2, wherein the method further includes receiving the desired orientation signal with the electronic orthodontic adjustment tool, wherein the electronic orthodontic adjustment tool includes a drive structure, and further wherein the adjusting includes adjusting with the drive structure based, at least in part, on the desired orientation signal.

C21. The method of any of paragraphs C1-C20.5.3, wherein, prior to the adjusting, the method further includes removing an/the archwire from the archwire slot.

C21.1 The method of paragraph C21, wherein, subsequent to the adjusting, the method further includes at least one of locating the archwire within the archwire slot and locating another archwire within the archwire slot.

C22. The method of any of paragraphs C1-C21.1, wherein the method includes performing the adjusting while an/the archwire extends within the archwire slot.

C23. The method of any of paragraphs C1-C22, wherein the orthodontic bracket includes the orthodontic bracket of any of paragraphs A1-A13.1.

C24. The method of any of paragraphs C1-C23, wherein the electronic orthodontic adjustment tool includes the electronic orthodontic adjustment tool of any of paragraphs B1-B14.

INDUSTRIAL APPLICABILITY

The systems, brackets, tools, and methods disclosed herein are applicable to the dental and orthodontics industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of adjusting an orthodontic bracket that includes an archwire slot while the orthodontic bracket is operatively attached to a patient's tooth, the method comprising:
   operatively engaging the orthodontic bracket with an engagement structure of an electronic orthodontic adjustment tool;
   electronically determining a present orientation of the archwire slot relative to a reference orientation at a given point in time;
   displaying a displayed orientation of the archwire slot with the electronic orthodontic adjustment tool, wherein the displayed orientation is based, at least in part, on the present orientation; and
   adjusting the orientation of the archwire slot relative to the reference orientation based, at least in part, on the displaying.

2. The method of claim 1, wherein the operatively engaging includes directly and operatively engaging the engagement structure with the orthodontic bracket.

3. The method of claim 2, wherein the operatively engaging includes extending the engagement structure within the archwire slot.

4. The method of claim 1, wherein the operatively engaging includes directly and operatively engaging the engagement structure with an archwire that extends within the archwire slot to indirectly and operatively engage the orthodontic bracket.

5. The method of claim 1, wherein the electronically determining includes receiving a current orientation indication signal, which is indicative of the orientation of the archwire slot relative to the reference orientation at the given point in time, with the electronic orthodontic adjustment tool.

6. The method of claim 5, wherein the receiving includes receiving from a transmitter of the orthodontic bracket.

7. The method of claim 1, wherein the electronically determining includes electronically determining with an orientation-determining structure of the electronic orthodontic adjustment tool.

8. The method of claim 1, wherein the electronically determining includes electronically determining a rotation of the archwire slot relative to a reference rotation about at least one rotational axis.

9. The method of claim 1, wherein the electronically determining includes electronically determining a translation of the archwire slot relative to a reference location along at least one translational axis.

10. The method of claim 1, wherein the displayed orientation is at least one of:
    (i) the present orientation;
    (ii) indicative of a difference between the present orientation and a desired orientation of the archwire slot; and
    (iii) indicative of a difference between the present orientation and an initial orientation.

11. The method of claim 1, wherein the method further includes receiving a prescribed orientation with the electronic orthodontic adjustment tool, wherein the prescribed orientation is indicative of a prescribed orientation of the archwire slot relative to the reference orientation, and further wherein the adjusting includes adjusting based, at least in part, on the prescribed orientation.

12. The method of claim 11, wherein the method further includes generating an orientation signal with the electronic orthodontic adjustment tool, wherein the orientation signal is based, at least in part, on the prescribed orientation, and further wherein the adjusting includes adjusting based, at least in part, on the orientation signal.

13. The method of claim 12, wherein the method further includes receiving the orientation signal with the orthodontic bracket, wherein the orthodontic bracket includes a drive structure, and further wherein the adjusting includes adjusting with the drive structure based, at least in part, on the orientation signal.

14. The method of claim 12, wherein the method further includes receiving the orientation signal with the electronic orthodontic adjustment tool, wherein the electronic orthodontic adjustment tool includes a drive structure, and further wherein the adjusting includes adjusting with the drive structure based, at least in part, on the orientation signal.

15. The method of claim 1, wherein, prior to the adjusting, the method further includes removing an archwire from the archwire slot, and further wherein, subsequent to the adjusting, the method further includes at least one of locating the archwire within the archwire slot and locating another archwire within the archwire slot.

16. The method of claim 1, wherein the method includes performing the adjusting while an archwire extends within the archwire slot.

* * * * *